(12) United States Patent
Hurault et al.

(10) Patent No.: US 10,697,426 B2
(45) Date of Patent: Jun. 30, 2020

(54) WIND TURBINE BLADE WITH AERODYNAMIC DEVICE ATTACHED THERETO

(71) Applicant: Vestas Wind Systems A/S, Aarhus N. (DK)

(72) Inventors: Jeremy Hurault, Southampton (GB); Raphael Sajous, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 157 days.

(21) Appl. No.: 15/777,256

(22) PCT Filed: Nov. 22, 2016

(86) PCT No.: PCT/DK2016/050379
§ 371 (c)(1),
(2) Date: May 18, 2018

(87) PCT Pub. No.: WO2017/088880
PCT Pub. Date: Jun. 1, 2017

(65) Prior Publication Data
US 2018/0347540 A1 Dec. 6, 2018

(30) Foreign Application Priority Data

Nov. 24, 2015 (GB) .................................. 1520725.1

(51) Int. Cl.
*F03D 1/06* (2006.01)

(52) U.S. Cl.
CPC ...... *F03D 1/0675* (2013.01); *F05B 2240/122* (2013.01); *F05B 2240/32* (2013.01);
(Continued)

(58) Field of Classification Search
CPC ... F15D 1/002–005; F15D 1/12; B29C 65/48; B29C 65/4825;
(Continued)

(56) References Cited

U.S. PATENT DOCUMENTS

| 8,162,590 B2 * | 4/2012 | Haag ..................... F03D 1/0633 |
| | | 415/4.3 |
| 8,506,250 B2 * | 8/2013 | Bagepalli ............. F03D 1/0675 |
| | | 416/62 |

(Continued)

FOREIGN PATENT DOCUMENTS

| CN | 102734059 A | 10/2012 |
| CN | 102996328 A | 3/2013 |

(Continued)

OTHER PUBLICATIONS

China National Intellectual Property Administration, First Notification of Office Action in CN Application No. 201680078342.2, dated Jul. 5, 2019.

(Continued)

*Primary Examiner* — Michael Lebentritt
*Assistant Examiner* — Topaz L. Elliott
(74) *Attorney, Agent, or Firm* — Wood Herron & Evans LLP

(57) ABSTRACT

An aerodynamic device is described for mounting to an outer surface of a wind turbine blade. The aerodynamic device includes a baseplate having an inner surface defining a mounting region and a sealing region at least partially surrounds the mounting region. The mounting region is bonded to the outer surface of the blade by an adhesive. A seal is provided between the sealing region of the baseplate and the outer surface of the blade. The seal at least partially surrounds the mounting region. A barrier is provided between the seal and the adhesive. The barrier is arranged (Continued)

substantially to prevent contact between the seal and the adhesive.

19 Claims, 6 Drawing Sheets

(52) U.S. Cl.
CPC ....... *F05B 2240/57* (2013.01); *F05B 2260/30* (2013.01); *F05B 2260/96* (2013.01); *Y02E 10/721* (2013.01)

(58) Field of Classification Search
CPC ......... B29C 65/50–5035; B29C 65/505; F05B 2240/32; F05B 2240/122
See application file for complete search history.

(56) References Cited

U.S. PATENT DOCUMENTS

| | | | | |
|---|---|---|---|---|
| 8,523,515 B2* | 9/2013 | Drobietz | ............... | F03D 1/0675 415/119 |
| 8,678,746 B2* | 3/2014 | Haag | .................... | F03D 1/0633 415/4.3 |
| 9,051,919 B2* | 6/2015 | Jensen | .................. | F03D 1/0608 |
| 9,133,816 B2* | 9/2015 | Jensen | .................. | F03D 1/0608 |
| 9,273,667 B2* | 3/2016 | Enevoldsen | .......... | F03D 1/0633 |
| 9,562,513 B2* | 2/2017 | Tobin | .................... | F03D 1/0675 |
| 9,869,296 B2* | 1/2018 | Tobin | .................... | F03D 1/0675 |
| 9,890,764 B2* | 2/2018 | Pal | ........................ | F03D 1/0675 |
| 9,945,357 B2* | 4/2018 | Enevoldsen | .......... | F03D 7/0204 |
| 9,970,412 B2* | 5/2018 | Hayden | ................. | F03D 1/0675 |
| 10,436,175 B2* | 10/2019 | Kuhn | .................... | F03D 1/0675 |
| 2009/0087314 A1* | 4/2009 | Haag | .................... | F03D 1/0633 416/147 |
| 2011/0018282 A1 | 1/2011 | Hayashi et al. | | |
| 2011/0142666 A1* | 6/2011 | Drobietz | ............... | F03D 1/0675 416/228 |
| 2011/0223030 A1 | 9/2011 | Huck et al. | | |
| 2012/0134817 A1* | 5/2012 | Bagepalli | ............. | F03D 1/0675 416/62 |
| 2012/0189444 A1 | 7/2012 | Haag | | |
| 2012/0257977 A1* | 10/2012 | Jensen | .................. | F03D 1/0608 416/223 R |
| 2012/0257978 A1* | 10/2012 | Jensen | .................. | F03D 1/0608 416/223 R |
| 2012/0257979 A1 | 10/2012 | Jensen et al. | | |
| 2012/0269644 A1* | 10/2012 | Enevoldsen | ............ | F03D 1/065 416/235 |
| 2013/0129520 A1* | 5/2013 | Enevoldsen | .......... | F03D 1/0633 416/235 |
| 2013/0266441 A1* | 10/2013 | Enevoldsen | .......... | F03D 7/0204 416/23 |
| 2013/0323070 A1* | 12/2013 | Grabau | ................. | F03D 1/0675 416/229 R |
| 2014/0328687 A1 | 11/2014 | Tobin et al. | | |
| 2015/0118058 A1* | 4/2015 | Vedula | .................. | F03D 1/0675 416/236 R |
| 2015/0198141 A1* | 7/2015 | Hayden | ................. | F03D 1/0675 416/1 |
| 2016/0169190 A1* | 6/2016 | Neumann | ............. | F03D 1/0675 29/889.21 |
| 2016/0327020 A1* | 11/2016 | Tobin | .................... | F03D 1/0675 |
| 2017/0016426 A1* | 1/2017 | Kuhn | ...................... | F03D 80/30 |
| 2017/0107969 A1* | 4/2017 | Tobin | .................... | F03D 1/0675 |
| 2017/0218916 A1* | 8/2017 | Lehmann Madsen | ...................... | F03D 1/0641 |
| 2019/0234375 A1* | 8/2019 | Potentier | ............... | F03D 1/0633 |
| 2019/0360509 A1* | 11/2019 | El Naga | ................. | B33Y 80/00 |

FOREIGN PATENT DOCUMENTS

| | | | | |
|---|---|---|---|---|
| DE | 102013210737 A1 * | 12/2014 | .......... | F03D 1/0675 |
| EP | 2027390 B1 | 2/2009 | | |
| EP | 2484896 A1 | 8/2012 | | |
| EP | 2484898 A1 | 8/2012 | | |
| EP | 2799709 A1 | 11/2014 | | |
| WO | 2014048437 A1 | 4/2014 | | |
| WO | 2014086703 A1 | 6/2014 | | |
| WO | 2014198354 A1 | 12/2014 | | |
| WO | 2015150358 A1 | 10/2015 | | |

OTHER PUBLICATIONS

Intellectual Property Office, Search Report in GB1520725.1, dated Jan. 14, 2016.
European Patent Office, International Search Report and Written Opinion in PCT Application Serial No. PCT/DK2016/050379, dated Feb. 2, 2017.

* cited by examiner

WIND TURBINE BLADE WITH AERODYNAMIC DEVICE ATTACHED THERETO

TECHNICAL FIELD

The present invention relates generally to wind turbine blades and more specifically to a wind turbine blade having an aerodynamic device mounted to a surface of the blade. The invention also relates to an aerodynamic device for mounting to a wind turbine blade and to a method of mounting an aerodynamic device to a wind turbine blade.

BACKGROUND

It is known to provide a variety of aerodynamic devices on the outer surface of wind turbine blades in order to improve the performance of the blade or, for example, to reduce noise levels produced by the blades in use. Typical aerodynamic devices include flaps such as Gurney flaps, vortex generators, and other trailing edge devices such as serrations.

The devices may be formed integrally with the outer shell of the blade, or they may be mounted to the blade shell. These devices are often generally referred to as 'add-ons', and may be provided on the blade during the blade manufacturing process, or later to existing blades as a retrofit.

The aerodynamic devices typically comprise a baseplate configured for mounting to the outer surface of the blade. The baseplate supports aerodynamic features such as flaps, turbulence producing formations and/or serrations. The baseplate is typically bonded to the outer shell of the blade by means of adhesive.

The blade add-ons should remain firmly secured to the blade during the service life of the wind turbine, which is typically twenty years or more. As the blade moves through the air at high speed when the rotor rotates, these aerodynamic devices experience significant forces. Any degradation of the adhesive may therefore present a risk of the devices being torn from the surface of the blade in use.

It is therefore important to ensure that the adhesive is not compromised during mounting of the add-ons and thereafter when the wind turbine is in use. Wind turbines are often exposed to harsh environmental conditions and experience extremes of temperature and other climatic conditions. It is important to protect the adhesive from exposure to these conditions, otherwise there is a risk that the adhesive may be compromised or degrade over time. In particular, it is desirable to prevent the adhesive coming into contact with moisture, dust and direct exposure to sunlight.

One solution to this problem is described in the applicant's European patent no. EP2027390, whereby sealant is provided at the periphery of a turbulence generating strip. The sealant serves to seal the edges of the device to the outer surface of the blade. The seal prevents ingress of moisture and dust between the surface of the blade and the device and thus protects the adhesive that bonds the strip to the surface of the blade.

However, when the sealant is initially applied, it may be difficult to prevent the sealant from coming into contact with the adhesive bonding the device to the blade surface. There is therefore a risk that the sealant may interfere with the adhesive bond between the device and the blade. The sealant also remains visible around the edges of the device, and thus is itself exposed to moisture and dust in use, which may cause the sealant to deteriorate over time.

Against this background, it as an object of the present invention to address at least one of these problems.

SUMMARY OF THE INVENTION

According to a first aspect of the present invention, there is provided a wind turbine blade comprising an aerodynamic device mounted to an outer surface of the blade, the aerodynamic device comprising a baseplate having an inner surface defining a mounting region and a sealing region at least partially surrounding the mounting region, wherein: the mounting region is bonded to the outer surface of the blade by an adhesive; a seal is provided between the sealing region of the baseplate and the outer surface of the blade, the seal at least partially surrounding the mounting region; and a barrier is provided between the seal and the adhesive, the barrier being arranged substantially to prevent contact between the seal and the adhesive.

The provision of a barrier between the seal and the adhesive advantageously prevents the seal from coming into contact with the adhesive. The seal is therefore prevented from interfering with or otherwise compromising the adhesive bond between the device and the blade when the device is initially mounted to the blade, and subsequently when the blade is in use during the lifetime of the wind turbine.

The aerodynamic device may be any blade add-on, for example it may be a flap or a turbulence generating device such as vortex generators. Such devices typically include a baseplate having an inner surface for bonding to the blade surface. An outer surface of the baseplate may include one or more turbulence generating features such as vortex generators. Alternatively, a flap may extend from the baseplate. The device may be either on a pressure surface or a suction surface of the blade, at the leading edge or trailing edge of the blade, or at any other suitable position on the blade surface. In particular examples of the invention discussed in detail later, the device is a serrated trailing edge device, which is mounted to the trailing edge of the blade and includes a plurality of serrations that extend from the baseplate.

The baseplate may be made of any suitable material, but preferably it is made from a plastics material. In preferred embodiments, the baseplate is an injection-moulded component. Aerodynamic features of the device, such as serrations or turbulence-generating features may advantageously be integrally-formed with the baseplate. Equally, in some embodiments the barrier may be integrally formed with the baseplate. This reduces the number of parts and reduces cost, and increases the structural integrity and ease of mounting of the device.

The baseplate may be any suitable shape, for example rectangular or substantially rectangular or substantially trapezoidal. The baseplate is preferably relatively thin, typically of the order of a few millimetres in thickness. The baseplate is also preferably substantially planar. The baseplate may therefore have some flexibility allowing it to conform to contours of the outer surface of the blade.

The mounting region of the baseplate preferably occupies a substantial portion (e.g. a majority) of the inner surface of the baseplate. Maximising the area of the mounting region is advantageous since it maximises the bond area between the baseplate and the blade. The mounting region may be any suitable shape, but preferably corresponds substantially in shape to the baseplate (e.g. substantially rectangular or trapezoidal) and is located inwardly of an outer perimeter of the baseplate. The sealing region preferably completely surrounds the mounting region and occupies an area of the inner surface of the baseplate between the mounting region and the perimeter of the baseplate.

The seal may be any suitable seal or sealant. The seal functions to prevent dust, moisture or other contaminants from coming into contact with the adhesive during the lifetime of the wind turbine. Accordingly, the seal protects the adhesive so that the integrity of the adhesive bond between the device and the blade is maintained.

In certain embodiments, the seal comprises a gasket such as a rubber gasket provided between the baseplate and the outer surface of the blade. The barrier is located between the gasket and the adhesive and serves to retain the gasket and prevents the gasket from coming into contact with the adhesive during the initial mounting of the device to the blade and subsequently when the blade is in use.

In other embodiments, the seal is provided in the form of a wet sealant which subsequently hardens to form a seal. Suitable sealants include silicone and polyurethane (PU) sealants, but other suitable wet sealants will be apparent to persons skilled in the art. The sealant may be applied to the sealing region of the baseplate and/or to the blade surface prior to mounting the device to the blade, or it may be applied (for example injected) between the sealing region of the baseplate and the blade surface after the device is mounted, i.e. bonded, to the blade.

The wet sealant flows or spreads before curing or hardening and the barrier is arranged to prevent the flowing or spreading sealant from coming into contact with the adhesive. The barrier may advantageously be configured to define a tortuous path between the sealant and the adhesive. For example, and as will be discussed in more detail later, the barrier may be arranged to redirect or otherwise slow down the progression of the flowing or spreading sealant in such a way that the wet sealant cures or hardens before reaching the adhesive.

The adhesive used to bond the device to the blade may be any suitable adhesive, for example epoxy- or methacrylate-based structural adhesive may be used. However, a double-sided adhesive tape is particularly preferred. The tape preferably comprises a pressure-sensitive adhesive. Adhesive foam tapes are particularly preferred, for example an acrylic foam tape comprising a pressure-sensitive adhesive. Use of an adhesive tape is particularly convenient and facilitates the mounting process since it avoids the use of wet adhesives, which are more difficult to handle and control and must undergo a curing or hardening process. The adhesive tape is therefore also particularly convenient for use in the field where the device is retro-fitted to the blades of existing turbines.

The adhesive may be applied initially to the baseplate or to the outer surface of the blade. However, it is particularly preferred to apply the adhesive initially to the baseplate. For example, a layer of double-sided adhesive foam tape may be applied to the mounting region of the baseplate, and the baseplate is then pressed into contact with the outer surface of the blade to activate the pressure-sensitive adhesive and ensure a firm bond.

The barrier preferably at least partially surrounds the mounting region of the baseplate. More preferably, the barrier completely or at least substantially completely surrounds the mounting region. Accordingly, the barrier preferably at least partially surrounds the adhesive, or more preferably completely or substantially completely surrounds the adhesive.

The barrier may be separate from the baseplate, or integrated with the baseplate. In preferred embodiments of the invention, the barrier is integral with the baseplate, for example the barrier may be integrally formed with the baseplate. This facilitates the mounting process since it reduces the number of parts and fixes the position of the barrier relative to the baseplate thus avoiding the possibility of positioning errors during mounting of the device. It also advantageously reduces the cost of the device. In preferred embodiments, the barrier comprises one or more features that protrude from the inner surface of the baseplate. However, these features may be provided in the form of separate parts in other embodiments.

The one or more features forming the barrier may include features such as ribs, ridges, channels, lips or other suitable features or combinations of such features. In some embodiments, examples of which are described in detail later, the barrier comprises one or more ridges.

The ridges are preferably sized such that they do not touch or otherwise come into contact with the outer surface of the blade when the device is mounted to the blade. Accordingly, a gap is preferably defined between a tip or top portion of the one or more ridges and the outer surface of the blade when the device is mounted. The height of the ridges (or other such barrier features) may therefore be suitably selected in accordance with the height or thickness of the adhesive between the mounting region and the blade surface to ensure that the ridges do not prevent the necessary compression or squeezing of adhesive when the device is initially bonded to the blade. For example, the ridges may be slightly shorter than the thickness of the adhesive foam tape so that the ridges do not interfere with the compression of the tape and the action of the pressure-sensitive adhesive.

The barrier may include one or more ridges. Preferably the or each ridge completely surrounds the mounting region. In certain embodiments, the barrier may comprise a plurality of ridges, for example a series of ridges. The ridges may be mutually spaced apart such that channels are defined between adjacent ridges. The ridges and channels in-between ridges preferably completely surround the mounting region. In such arrangements, the barrier defines a tortuous path between the seal, e.g. wet sealant, and the adhesive. The channels between the ridges serve to redirect flowing or spreading wet sealant parallel to the edge of the mounting region rather than towards the mounting region. The sealant must therefore follow a longer and more restricted path before reaching the adhesive. The series of ridges therefore effectively slows down the sealant, which allows time for the sealant to cure before reaching the adhesive during mounting of the device to the blade.

The sealant will tend to fill one or more of the channels between ridges closest to the outer perimeter of the baseplate before hardening. Accordingly, the resulting seal may comprise hardened sealant within at least one channel of the barrier. The presence of the hardened sealant within the channels has been found to provide a highly effective seal, and the ridges of the barrier also serve to maintain and stabilise the position of the sealant during the lifetime of the blade. The barrier in this configuration also provides additional protection for the adhesive during the service life of the blade as it effectively forms a second seal around the adhesive and hence further restricts the ability of water, dirt or other contaminants to reach the adhesive. In particular embodiments the second seal is a labyrinth seal.

In other embodiments the barrier may comprise a lip arranged to form a further seal against the outer surface of the blade. The lip preferably completely surrounds the mounting region. The lip is preferably flexible and able to deflect somewhat when the device is initially bonded to the blade so that the lip does not hinder compression of the adhesive or otherwise adversely affect the formation of an optimal adhesive bond between the baseplate and the blade. The lip preferably protrudes from the inner surface of the baseplate.

The lip may advantageously be inclined slightly towards the outer perimeter of the baseplate so that it is encouraged to deflect in this direction when the baseplate is pressed against the outer surface of the blade during the mounting/bonding process. This results in the lip being inclined towards the perimeter of the baseplate when the device is mounted to the blade. This is advantageous since the pressure of wet sealant acting on the lip forces the lip more tightly against the outer surface of the blade and enhances the sealing effect. The lip therefore completely blocks the passage of wet sealant towards the adhesive and hence prevents the sealant from coming into contact with the adhesive.

The sealing region of the baseplate preferably comprises a skirt. An inner surface of the skirt preferably at least partially defines the sealing region. The skirt preferably at least partially surrounds the mounting region, and more preferably completely or substantially completely surrounds the mounting region. The skirt is preferably inclined relative to the plane of the mounting region, such that the skirt is angled towards the outer surface of the blade. The skirt preferably forms a peripheral portion of the baseplate. Accordingly, an edge of the skirt preferably defines the outer perimeter of the baseplate. The edge of the skirt is preferably substantially in contact with the outer surface of the blade. Accordingly, the skirt may define an enclosed or substantially enclosed volume at least partially surrounding the adhesive between the baseplate and the outer surface of the blade. Preferably the substantially enclosed volume completely or substantially completely surrounds the adhesive.

The seal is preferably located within the substantially enclosed volume. Accordingly, the skirt may cover the seal completely or at least substantially. The skirt protects the seal and prevents the seal being directly exposed to sunlight, moisture dust etc. The skirt also advantageously serves to conceal the seal thus enhancing the aesthetics of the aerodynamic device, since the seal is hidden by the skirt. The skirt also enhances the performance of the device since it provides a smooth transition between the outer surface of the blade and the device and can be shaped to provide an optimum surface for airflow.

The skirt is preferably integrally formed with the remainder of the baseplate and may be made from the same material as the remainder of the baseplate, e.g. a plastics material or it may be made from a different material. In particularly advantageous configurations the skirt may itself form a seal against the outer surface of the blade. The skirt may for example act as a gasket. To this end, the skirt may be made from an elastic material such as rubber or other suitable material. A rubber skirt may be formed integrally with a plastic baseplate via injection moulding or extrusion, for example.

Accordingly, the inventive concept also encompasses a wind turbine blade comprising an aerodynamic device mounted to an outer surface of the blade, the aerodynamic device comprising: a baseplate having an inner surface defining a substantially planar mounting region, the baseplate further comprising a skirt at least partially surrounding the mounting region and inclined relative to the plane of the mounting region, the skirt having an edge defining an outer perimeter of the baseplate, wherein the mounting region of the baseplate is bonded to the outer surface of the blade by an adhesive layer such that the mounting region of the baseplate is spaced from the outer surface of the blade by the adhesive layer; and wherein the edge of the skirt is in contact with the outer surface of the blade such that the skirt defines a substantially enclosed volume at least partially surrounding the adhesive layer between the baseplate and the outer surface of the blade.

The aerodynamic device may include one or more anti-peel features configured to further reduce the possibility of the device being torn from the surface of the blade in use. The anti-peel features are suitable when the device is mounted to an edge of the blade, and particularly suitable when the device is mounted at the trailing edge of the blade. The anti-peel features may extend from the baseplate and be arranged to overlap an opposite surface of the blade to the surface against which the baseplate is attached. For example, if the baseplate is attached to the pressure surface of the blade, then the anti-peel features would overlap the suction surface of the blade. The pressure surface and suction surface of the blade may alternatively be referred to as the pressure side and suction side respectively.

In particular embodiments, the anti-peel features may be configured as fingers. For example, a series of discrete fingers may be configured to overlap the suction surface of the blade. The fingers may be spaced at intervals along the baseplate. Alternatively a continuous sleeve could be provided to overlap the suction surface. The anti-peel features (e.g. the fingers) are preferably arranged such that a slot is effectively defined between the fingers and the inner surface of the baseplate. The edge of the blade (e.g. the trailing edge) is received in this slot. The fingers serve to counteract any peel forces acting on the baseplate by bearing down against the opposite surface of the blade to the surface against which the baseplate is bonded.

According to another aspect of the present invention, there is provided an aerodynamic device for mounting to an outer surface of a wind turbine blade, the device comprising a baseplate having an inner surface defining a mounting region for bonding to the blade and a sealing region at least partially surrounding the mounting region, wherein the sealing region includes a barrier protruding from the inner surface of the baseplate, the barrier being located between the mounting region and an outer perimeter of the baseplate.

According to a further aspect of the present invention there is provided a method of mounting an aerodynamic device to an outer surface of a wind turbine blade, the method comprising:
   a. providing a wind turbine blade having an outer surface;
   b. providing an aerodynamic device having a baseplate comprising an inner surface defining a mounting region and a sealing region at least partially surrounding the mounting region;
   c. bonding the baseplate to the outer surface of the blade by an adhesive applied between the mounting region of the baseplate and the outer surface of the blade;
   d. providing a seal between the sealing region of the baseplate and the outer surface of the blade such that the seal at least partially surrounds the mounting region; and
   e. substantially preventing the seal from contacting the adhesive by a barrier arranged between the seal and the adhesive.

The steps of the method may be performed in any suitable order. Preferably step (c) of the method comprises applying the adhesive to the mounting region of the baseplate. As already discussed, this facilitates the mounting process.

The method may comprise applying wet sealant to the sealing region of the baseplate before bonding the baseplate to the blade, or providing wet sealant between the sealing region of the baseplate and the outer surface of the blade after bonding the device to the blade.

As discussed previously, the method may comprise slowing the progression of wet sealant towards the adhesive by means of the barrier such that the sealant cures or hardens before reaching the adhesive. Accordingly, the method may comprise configuring the barrier such that it provides a tortuous path between the seal and the adhesive. The method may further comprise substantially covering the seal with a skirt forming a peripheral portion of the baseplate.

According to a further aspect of the invention there is provided a method of making a wind turbine blade comprising mounting an aerodynamic device to an outer surface of the blade according to the methods described above.

According to a further aspect of the invention there is provided an aerodynamic device for attaching to a trailing edge of a wind turbine blade, the device comprising a baseplate having an inner surface for bonding to a pressure surface of the blade and one or more anti-peel features extending from the baseplate and arranged to overlap a suction surface of the blade when the device is mounted to the blade.

In embodiments in which the skirt itself functions as a gasket or otherwise provides a seal against the blade surface, the seal and/or the barrier may be dispensed with.

Accordingly, the invention further provides a wind turbine blade comprising an aerodynamic device mounted to an outer surface of the blade, the aerodynamic device comprising: a baseplate having an inner surface defining a substantially planar mounting region, the baseplate further comprising a skirt at least partially surrounding the mounting region and inclined relative to the plane of the mounting region, the skirt having an edge defining an outer perimeter of the baseplate, wherein the mounting region of the baseplate is bonded to the outer surface of the blade by an adhesive layer such that the mounting region of the baseplate is spaced from the outer surface of the blade by the adhesive layer; and wherein the edge of the skirt is in contact with the outer surface of the blade such that the skirt defines a substantially enclosed volume at least partially surrounding the adhesive layer between the baseplate and the outer surface of the blade.

The invention also provides an aerodynamic device for mounting to an outer surface of a wind turbine blade, the device comprising a baseplate having an inner surface defining a substantially planar mounting region for bonding to the blade by an adhesive layer, and a skirt at least partially surrounding the mounting region, the skirt having an edge defining an outer periphery of the baseplate, wherein the skirt is inclined relative to the plane of the mounting region, such that when the baseplate is mounted to the outer surface of the blade, the mounting region of the baseplate is spaced from the outer surface of the blade by the adhesive layer and the edge of the skirt is in contact with the outer surface of the blade to define a substantially enclosed volume at least partially surrounding the adhesive layer between the baseplate and the outer surface of the blade.

The anti-peel features discussed previously may be used in combination with any of the embodiments described herein or encompassed by the inventive concepts defined above, or they may be used in conjunction with any other suitable aerodynamic devices.

Accordingly, the present invention also provides an aerodynamic device for attaching to a trailing edge of a wind turbine blade, the device comprising a baseplate having an inner surface for bonding to a pressure surface of the blade and one or more anti-peel features extending from the baseplate and arranged to overlap a suction surface of the blade when the device is mounted to the blade. As discussed previously, a slot for receiving the trailing edge of the blade may be defined between the inner surface of the baseplate and the one or more anti-peel features. In preferred embodiments the anti-peel features comprise one or more fingers arranged to overlap the suction surface of the blade.

The invention also provides a wind turbine comprising a wind turbine blade having an aerodynamic device as described herein mounted thereto.

Various optional and advantageous features of the present invention have been discussed in detail above in relation to the first aspect of the present invention. It will be appreciated that these features are equally applicable to all of the other aspects of the invention and repetition of these features has been avoided purely for reasons of conciseness. Accordingly, within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

DETAILED DESCRIPTION

Figure 1:
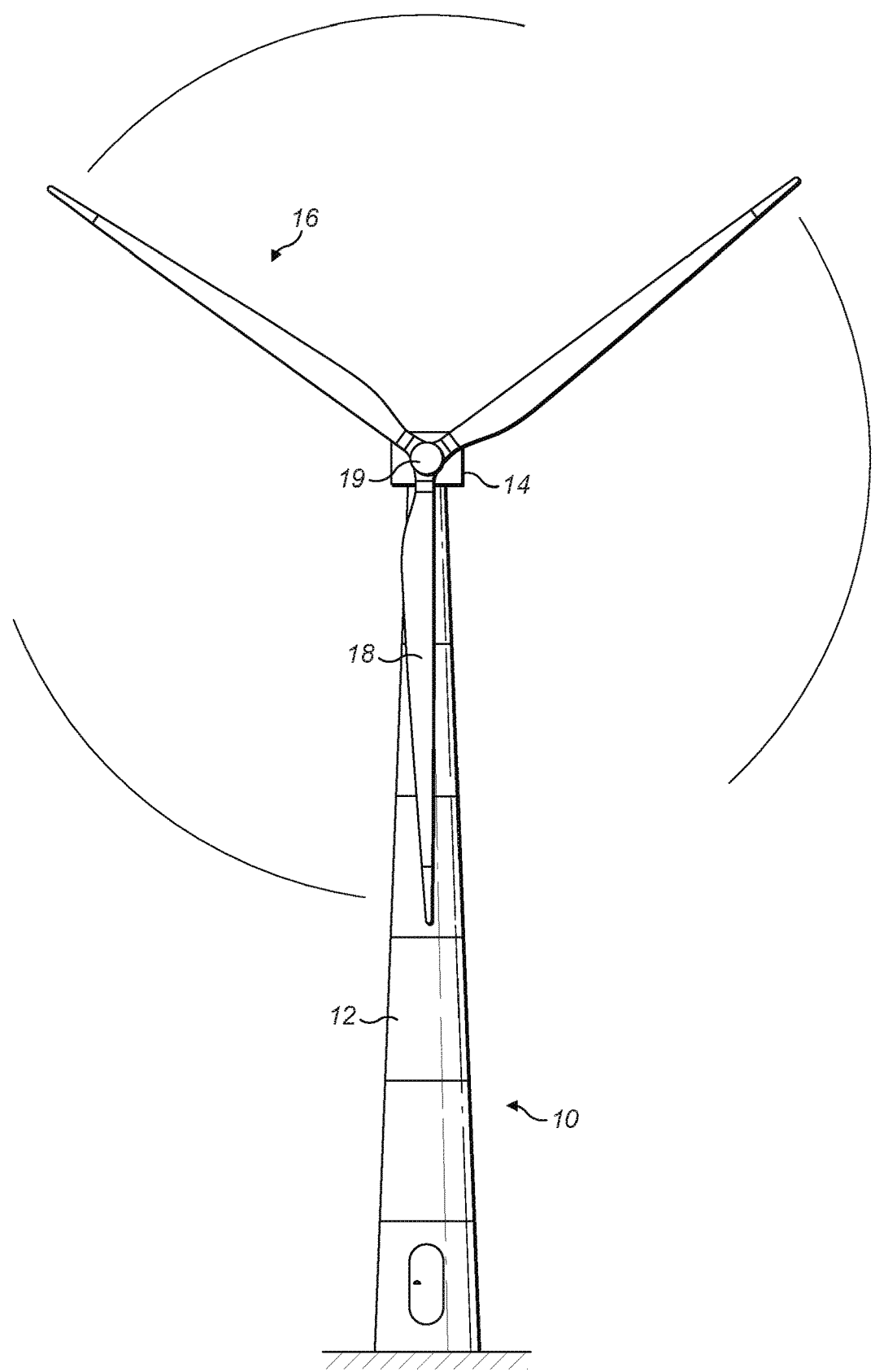
FIG. 1 shows a wind turbine according to an embodiment of the present invention.

FIG. 1 shows a wind turbine 10 according to an embodiment of the present invention. The wind turbine 10 comprises a tower 12 supporting a nacelle 14 to which a rotor 16 is mounted. The rotor 16 comprises a plurality of wind turbine blades 18 that extend radially from a central hub 19. In this example, the rotor 16 comprises three blades 18.

Figure 2:
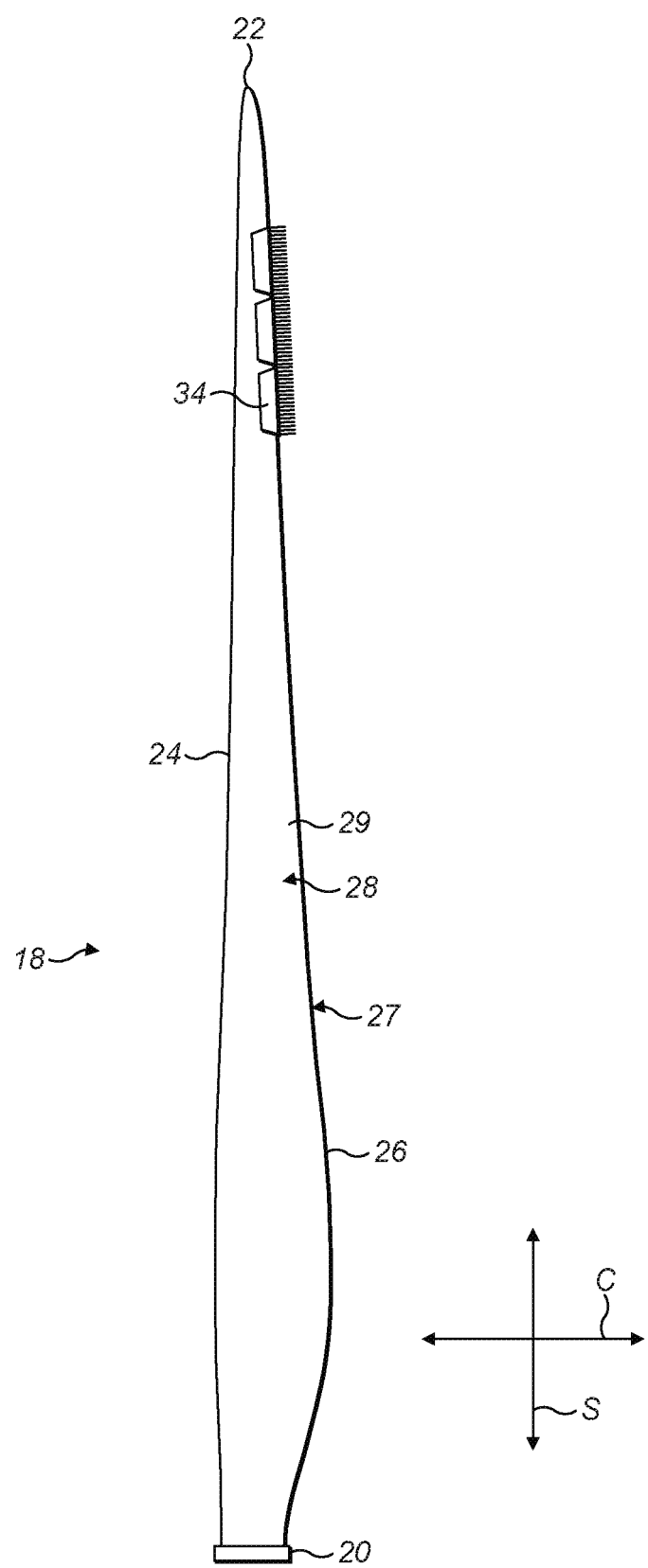
FIG. 2 is a plan view of a wind turbine blade having a plurality of aerodynamic devices mounted to its outer surface.

FIG. 2 is a plan view of one of the blades 18 of the wind turbine 10. The blade 18 extends from a root end 20 to a tip end 22 in a longitudinal 'spanwise' direction S, and between a leading edge 24 and a trailing edge 26 in a transverse 'chordwise' direction C. The blade 18 comprises an outer shell 27 formed primarily of fibre-reinforced plastic (FRP). The outer shell 27 defines an outer surface 28 of the blade 18. The outer surface 28 comprises a pressure surface 29 on a pressure side of the blade 18 and a suction surface 30 on the suction side of the blade 18. Only the pressure surface 29 is visible in FIG. 2, but both surfaces 29, 30 can be seen for example in FIG. 4. As shown schematically in FIG. 2, a plurality of aerodynamic devices 34 are mounted to the outer surface 28 of the blade 18 and spaced at intervals along the trailing edge 26.

Figure 3:
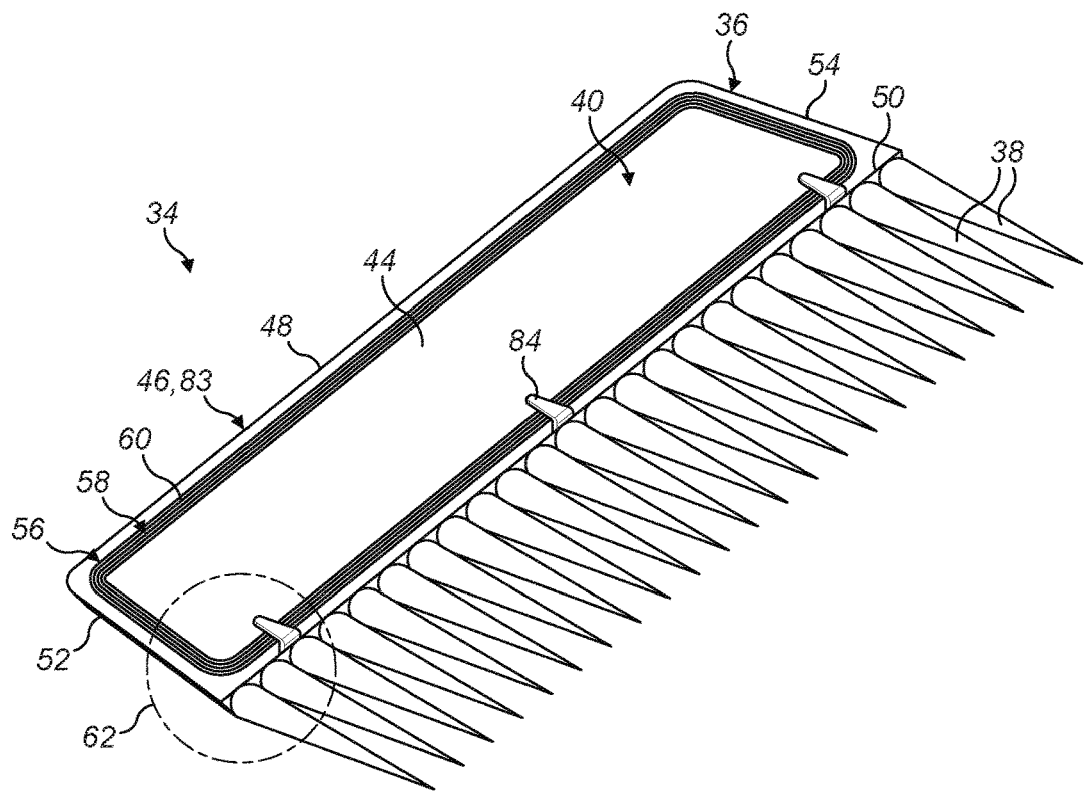
FIG. 3 is a perspective view of a serrated trailing edge device according to a first embodiment of the present invention.

Referring to FIG. 3, this is a perspective view of one of the aerodynamic devices 34 indicated schematically in FIG. 2 according to a first embodiment of the invention. In this example, the device 34 is a serrated trailing edge add-on. The device 34 comprises a baseplate 36 for mounting to the blade 18. A plurality of serrations 38 extend from the baseplate 36. The serrations 38 serve to reduce noise caused by the blade 18 in use. The serrations 38 are integrally formed with the baseplate 36. In this example, the device 34 is an injection moulded plastics components formed from acrylonitrile butadiene styrene (ABS), but other suitable materials or manufacturing processes may be used. Injection moulding is particularly preferred due to the complex shapes of the parts.

The baseplate 36 has a generally trapezoidal shape comprising first and second generally trapezoidal surfaces 40 and 42, also referred to as 'inner' and 'outer' surfaces respectively. Only the inner surface 40 is visible in the perspective view of FIG. 3. The inner surface 40 comprises a mounting region 44 for bonding to the outer surface 28 of the blade 18. The mounting region 44 in this example is substantially flat and generally trapezoidal in shape, although it could also be rectangular. The mounting region 44 occupies a major central portion of the inner surface 40 of the baseplate 36.

A perimeter 46 of the baseplate 36 comprises four edges: a leading edge 48, a trailing edge 50, and two transverse edges 52, 54 between the leading and trailing edges 48 and 50. The leading and trailing edges 48 and 50 are substantially parallel, with the leading edge 48 being slightly shorter than the trailing edge 50. The transverse edges 52, 54 converge slightly moving from the trailing edge 50 to the leading edge 48 of the baseplate 36 to provide the trapezoidal shape of the baseplate 36. This shape optimises airflow over the baseplate 36 in use. The serrations 38 extend outwards from near the trailing edge 50 of the baseplate 36.

The inner surface 40 of the baseplate 36 includes a sealing region 56 between the mounting region 44 and the perimeter 46 of the baseplate 36. The sealing region 56 surrounds the mounting region 44 in this example. The sealing region 56 includes a barrier 58 comprising a series of ridges 60. The ridges 60 protrude from the inner side 40 of the baseplate 36. The ridges 60 are each arranged in a generally trapezoidal loop or track surrounding the mounting region 44. Accordingly, a portion of each ridge 60 extends substantially parallel to each of the four edges 48, 50, 52 and 54 of the baseplate 36. The ridges 60 are shown more clearly in FIG. 3a, which is a detailed view of the region 62 encircled in FIG. 3. Here it can be seen that there are five ridges 60 in total, which are numbered 60a-e in FIG. 3a. The ridges 60a-e are mutually parallel and spaced apart relative to one another such that each ridge is located at a different respective distance from both the mounting region 44 and from the perimeter 46 of the baseplate 36.

Figure 3A:
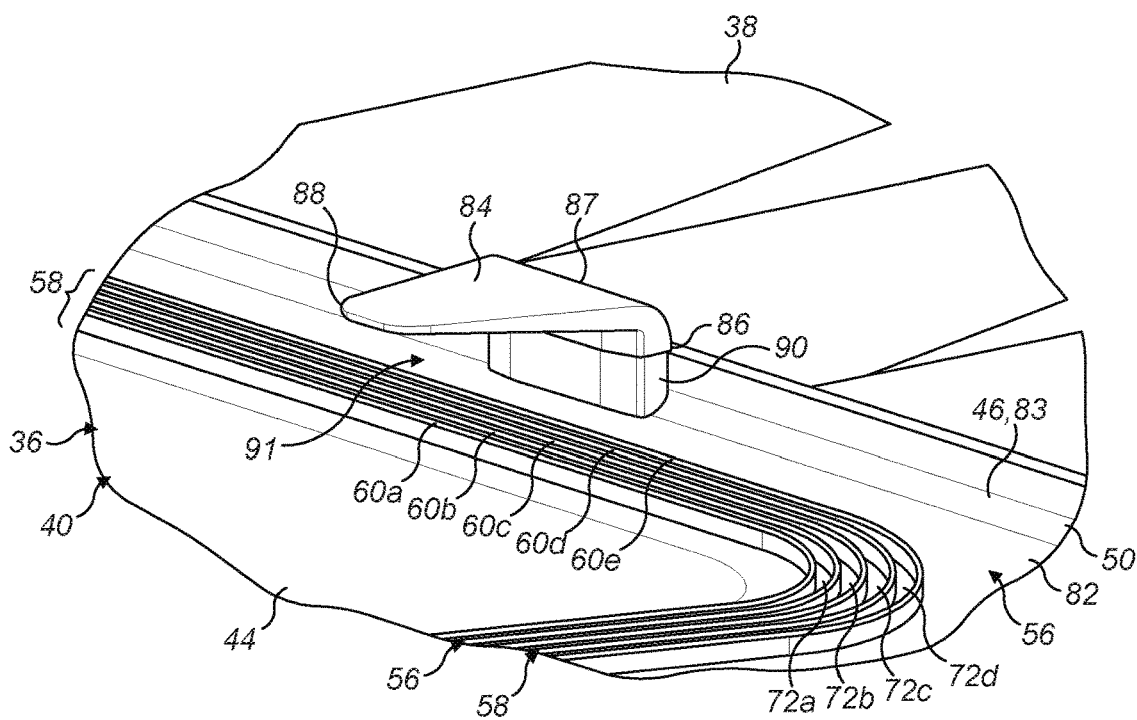
FIG. 3a is an enlarged perspective view of part of the serrated trailing edge device of FIG. 3.

The series of ridges 60a-e includes an innermost ridge 60a, located closest to the mounting region 44, an outermost ridge 60e located closest to the perimeter 46 of the baseplate 36, and three intermediate ridges 60b, 60c and 60d between the innermost and outermost ridges 60a and 60e. The ridges 60a-e are spaced apart by approximately 0.4 mm in this example, such that a series of four channels 72a-d each having a width of approximately 0.4 mm are defined between the ridges 60a-e. As shown in FIG. 3a, the series of channels 72a-d includes an innermost channel 72a located closest to the mounting region 44, an outermost channel closest 72d to the perimeter 46 of the baseplate 36, and two intermediate channels 72b and 72c between the innermost and outermost channels 74 and 76.

The sealing region 56 of the baseplate 36 comprises a skirt 82, which surrounds the series of ridges 60a-e. Accordingly, the barrier 58 is located between the skirt 82 and the mounting region 44. A peripheral edge 83 of the skirt 82 defines the outer perimeter 46 of the baseplate 36. The skirt 82 is inclined slightly relative to the plane of the mounting region 44 such that the perimeter 46 of the baseplate 36 is in contact with the outer surface 28 of the blade 18 when the device 34 is mounted to the blade 18.

As shown in FIG. 3, the serrated trailing edge device 34 includes a plurality of anti-peel features in the form of 'fingers' 84. The fingers 84 may alternatively be referred to as 'tabs' or 'brackets'. There are three fingers 84 in this example, which are mutually spaced along the spanwise length of the device 34 near the trailing edge 50 of the baseplate 36. As shown in the detail view of FIG. 3a, each finger 84 is substantially L-shaped when viewed from the side and comprises a proximal end 86 and a distal end 88. The proximal end 86 is bonded to a spacer 90 that projects from the inner surface 40 of the baseplate 36 at the trailing edge 50 of the baseplate 36. The finger 84 includes a bend 87 between the proximal and distal ends 86 and 88. In this example, the angle of the bend 87 is slightly greater than ninety degrees. Accordingly, the distal end 88 of the finger 84 partially overlies the baseplate 36 and is spaced apart from the inner surface 40 of the baseplate 36 such a slot 91 is defined between the finger 84 and the baseplate 36. In another example, the proximal end 86 could be integral with the spacer 90.

Figure 4:
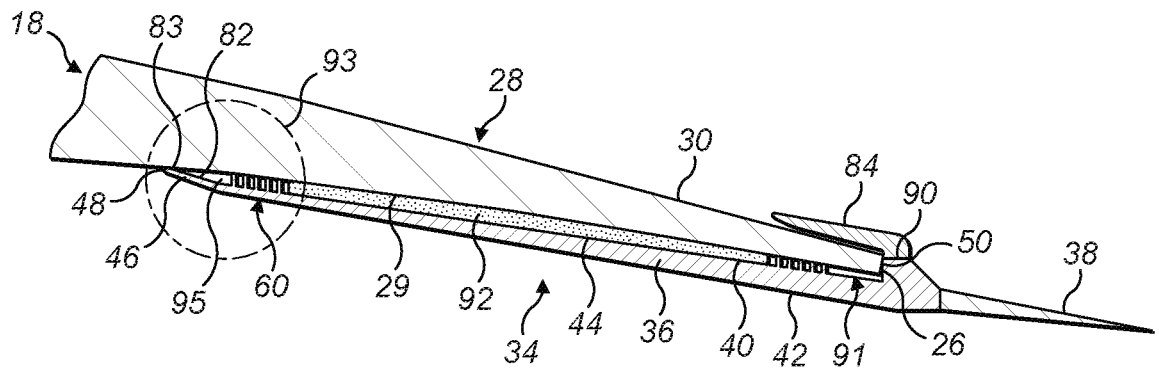
FIG. 4 is a cross-sectional side view of the serrated trailing edge device of FIG. 3 when mounted to the trailing edge of a wind turbine blade.

FIG. 4 shows a cross-sectional side view of the device 34 mounted at the trailing edge 26 of the blade 18. Referring to FIG. 4, it can be seen that the baseplate 36 is bonded to the pressure surface 29 of the blade 18. The trailing edge 50 of the baseplate 36 is located at or near the trailing edge 26 of the blade 18 and extends parallel to the trailing edge 26 of the blade 18. The serrations 38 therefore extend beyond the trailing edge 26 of the blade 18. The trailing edge 26 of the blade 18 is located in the slot 91 defined between the fingers 84 and the baseplate 36. The trailing edge 26 of the blade 18 abuts the spacers 90 to which the fingers 84 are mounted, and the fingers 84 overlie the suction surface 30 of the blade 18. The fingers 84 counteract peel forces that act on the device 34 in use and reduce the risk of the device 34 becoming detached from the blade 18 in use.

The device 34 is bonded to the outer surface 28 of the blade 18 by means of a layer of double-sided adhesive tape 92, comprising a pressure-sensitive adhesive. The tape 92 is applied to the mounting region 44 of the inner side 40 of the baseplate 36 prior to fitting the device 34 to the blade 18. In order to mount the device 34 to the blade 18, the device 34 is arranged in the desired position on the blade 18 and pressure is applied to the baseplate 36 to press the adhesive tape 92 into contact with the outer surface 28 of the blade 18.

Figure 4A:
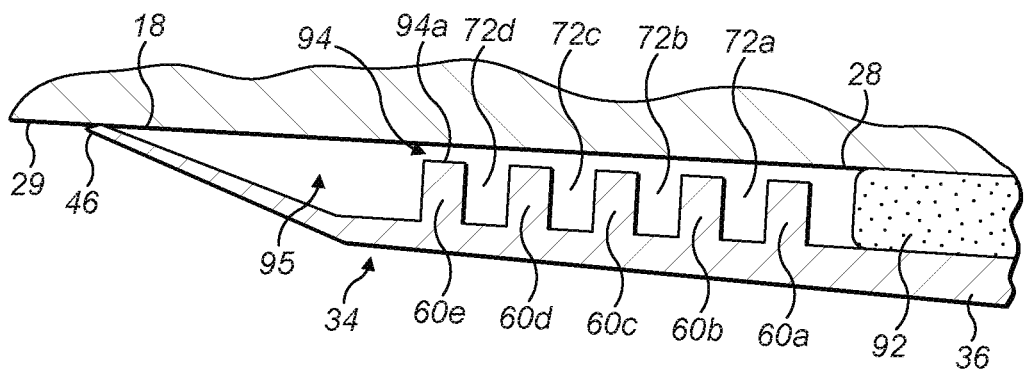
FIG. 4a is an enlarged view of part of FIG. 4.

Referring to FIG. 4a, which is an enlarged view of the region 93 encircled in FIG. 4, the tape 92 has a thickness of approximately 2 mm (millimetres) in this example. The ridges 60 of the baseplate 36 each have a height that is slightly less than the thickness of the tape 92. In this example, each ridge 60 has a height of approximately 1.9 mm. Accordingly, the ridges 60 are sized such that contact between the ridges 60 and the outer surface 28 of the blade 18 is avoided when the device 34 is mounted to the blade 18. This ensures that the ridges 60 do not interfere with compression of the adhesive tape 92 during bonding and thus the ridges 60 do not adversely affect the bond between the device 34 and the blade 18. A small gap 94 is therefore defined between the top or tip 94a of each ridge 60 and the pressure surface 29 of the blade 18 when the device 34 is bonded to the blade 18. In this example, the size of this gap 94 is approximately equal to the difference between the thickness of the tape 92 and the height of the ridge 60, i.e. the gap 94 is approximately 0.1 mm.

Referring again to FIG. 4, it can be seen that the baseplate 36 tapers in thickness moving in a chordwise direction from the trailing edge 50 of the baseplate 36 towards the leading edge 48. The thickness of the baseplate 36 is defined as the perpendicular distance between the inner and outer surfaces 40 and 42 of the baseplate 36. The baseplate 36 therefore tapers in thickness towards the leading edge 24 of the blade 18, which advantageously optimises airflow over the baseplate 36 when the blade 18 is in use.

The skirt 82 of the baseplate 36 is inclined towards the pressure surface 29 of the blade 18 when the baseplate 36 is mounted to the blade 18. The skirt 82 is relatively thin and provides a smooth transition between the blade surface 28 and the device 34, thus further optimising airflow over the baseplate 36. The peripheral edge 83 of the skirt 82 is in contact with the outer surface 28 of the blade 18 such that the skirt 82 defines a substantially enclosed volume 95 surrounding the adhesive layer 92 between the baseplate 36 and the outer surface 28 of the blade 18.

Figure 5:
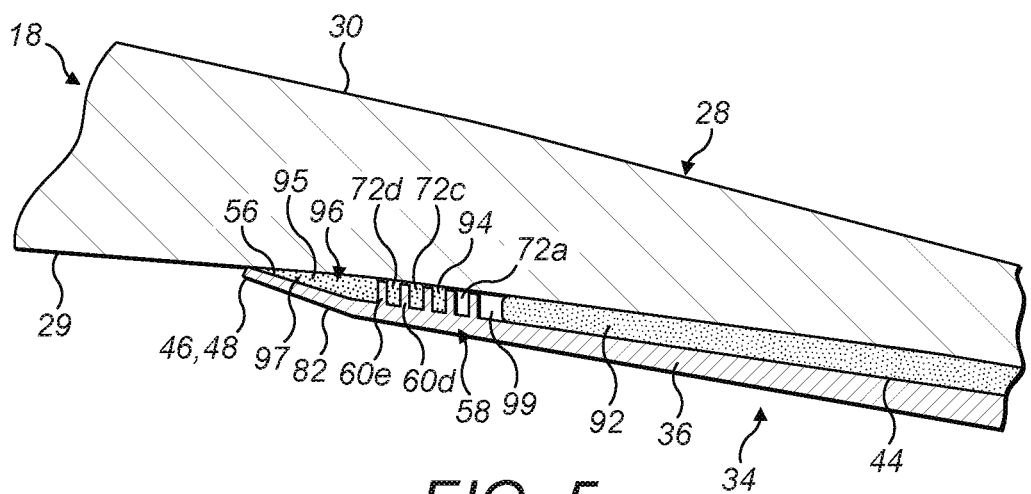
FIG. 5 shows sealant provided adjacent a peripheral edge of the serrated trailing edge device.

Referring now to FIG. 5, this shows a seal 96 at the periphery 46 of the baseplate 36 between the sealing region 56 of the baseplate 36 and the pressure surface 29 of the blade 18. The seal 96 protects the adhesive tape 92 from ingress of dust or moisture which may otherwise cause deterioration of the adhesive over time when the blade 18 is in use. The seal 96 is formed by supplying wet sealant 97 between the baseplate 36 and the blade surface 28. In this example, the sealant 97 is injected into the enclosed volume 95 defined by the skirt 82. The skirt 82 is relatively flexible and may be folded back slightly to facilitate injection of the sealant 97. Alternatively, the sealant 97 may be injected through one or more holes (not shown) provided in the skirt 82. As a further alternative, the wet sealant 97 may be applied to the baseplate 36 or blade surface 28 prior to mounting the device 34. The sealant 97 may be any suitable wet sealant, for example polyurethane (PU) or silicone sealant. Whilst FIG. 5 only shows the seal 96 near the leading edge 48 of the baseplate 36, it will be appreciated that the seal 96 surrounds the adhesive 92.

The series of ridges 60 described above and shown in FIG. 5 are provided to prevent the wet sealant 97 from contaminating the adhesive tape 92 that bonds the device 34 to the surface 28 of the blade 18. The ridges 60 form a barrier 58 between the adhesive tape 92 and the sealant 97 and serve to prevent the sealant 97 from coming into contact with the tape 92. When the sealant 97 is injected into the enclosed volume 95, it will tend to flow or spread out towards the adhesive tape 92. Due to the small gap 94 (0.1 mm—FIG. 4a) between the top 94a of the ridges 60 and the outer surface 28 of the blade 18, the wet sealant 97 is able to progress past the ridges 60 towards the tape 92. However, as the wet sealant 97 flows over a ridge 60, it will initially fill the channel 72 behind the ridge 60. The channels 72 have a relatively large width (approx. 0.4 mm) in comparison to the size of the gap 94 (approx. 0.1 mm) between the top 94a of a ridge 60 and the blade surface 28. Accordingly, the sealant 97 will preferentially flow along the channels 72 before flowing past the ridges 60. The channels 72 therefore redirect the spreading or flowing wet sealant 97 such that it circulates in the channels 72 around the mounting region 44 before progressing towards the mounting region 44.

For example, the wet sealant 97 is initially injected into the region between the perimeter 46 of the baseplate 36 and the outermost ridge 60e. After filling this region, the wet sealant 97 flows or spreads towards the adhesive tape 92 through the gap 94 (see also FIG. 4a) defined between the outermost ridge 60e and the blade surface 28. The wet sealant 97 then flows or spreads along the outermost channel 72d in a direction parallel to the edges of the mounting region 44. When the outermost channel 72d is full of sealant 97, the sealant 97 proceeds to flow or spread through the gap 94 defined between the intermediate ridge 60d and the blade surface 28 to fill the intermediate channel 78, and so on.

The ridges 60a-e therefore define a tortuous path between the sealant 97 and the adhesive 92 and serve to slow the progression of wet sealant 97 towards the adhesive tape 92 such that the sealant 97 cures before reaching the adhesive 92. The ridges therefore effectively form a labyrinth seal around the mounting region 44, and hence around the adhesive 92. It has been found that a series of five ridges 60 in this embodiment is sufficient to slow the sealant 97 sufficiently so that it cures before reaching the adhesive tape 92. It can be seen in FIG. 5 that the sealant 97 has cured before filling the innermost channel 72a between the ridges 60. Accordingly, there is a gap 99 between the cured sealant 97 and the adhesive tape 92 and the sealant 97 is prevented from contacting the tape 92. The adhesive bond between the device 34 and the outer surface 28 of the blade 18 is therefore not contaminated or otherwise compromised by the sealant 97. In addition, the wet sealant 97 is also constrained by the ridges 60a-e so that it flows in an outward direction away from the mounting region 44—the sealant 97 can flow past the peripheral edge 83 of the skirt 82 where it can be simply wiped off the blade surface when it is still in its wet state.

Referring still to FIG. 5, it can be seen that the seal 96, formed by the cured sealant 97 adjacent the periphery 46 of the baseplate 36, is located within the periphery 46 of the baseplate 36 and is covered by the skirt 82. The skirt 82 therefore protects the sealant 97 from direct exposure to climatic conditions and conceals the sealant 97 resulting in improved aesthetics. Further, the concealed sealant 97 does not adversely affect the aerodynamic performance of the blade 18 since it is not directly exposed to airflow over the blade 18. The skirt 82 is shaped to provide optimum airflow over the blade 18, which allows consistent and reproducible performance to be achieved.

Figure 6:
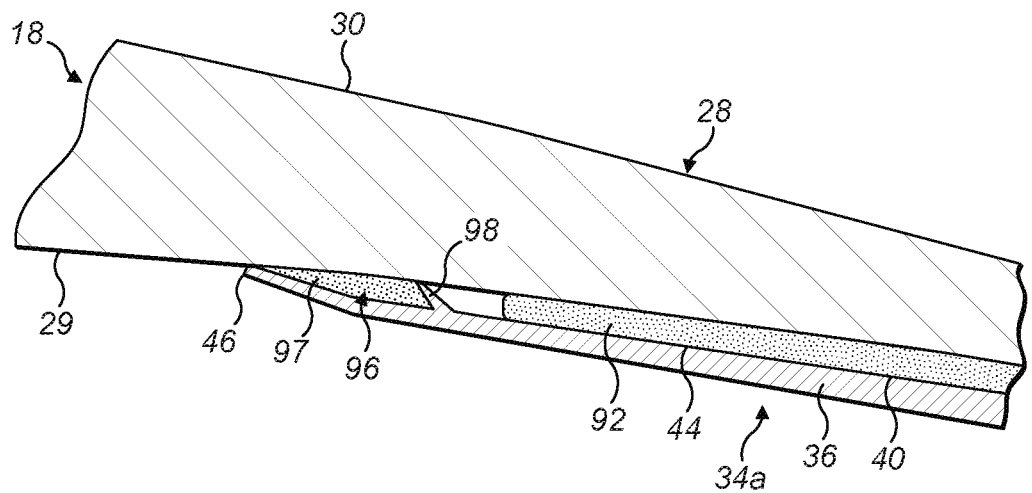
FIG. 6 illustrates a second embodiment of the serrated trailing edge device.

FIG. 6 shows an aerodynamic device 34a in accordance with a second embodiment of the present invention. The aerodynamic device 34a is identical to the first embodiment shown in FIG. 3, except that the barrier between the sealant 97 and the adhesive 92 comprises a flexible lip 98 protruding from the inner surface 40 of the baseplate 36 instead of the series of ridges 60 described in relation to the first embodiment. In common with the ridges 60 of the first embodiment, the lip 98 is arranged along a substantially trapezoidal path and forms a continuous loop surrounding the mounting region 44. The lip 98 is therefore provided between the periphery 46 of the baseplate 36 and the mounting region 44. As discussed below, the lip 98 forms a seal around the mounting region 44 and hence around the adhesive 92.

The lip 98 has a height that is slightly greater than the thickness of the adhesive tape 92. In this example, the height of the lip 98 is approximately 1.2 mm. The height of the lip 98 is selected so that the top of the lip 98 makes contact with the outer surface 28 of the blade 18 (in this case with the pressure surface 29) when the device 34a is mounted to the blade 18. The lip 98 is angled slightly towards the periphery 46 of the baseplate 36 to encourage a slight deflection of the lip 98 in this direction when the baseplate 36 is pressed against the outer surface 28 of the blade 18 to compress the adhesive tape 92.

The lip 98 itself forms a seal against the outer surface 28 (in this case the pressure surface 29) of the blade 18 to prevent any wet sealant 97 from flowing past the lip 98 towards the adhesive tape 92. As the lip 98 is inclined towards the periphery 46 of the baseplate 36, the pressure of the wet sealant 97 acting against the lip 98 will cause the lip 98 to move slightly towards a more vertical position. This results in the lip 98 being pushed more tightly against the outer surface 28 of the blade 18 by the sealant 97 thus creating a tighter seal.

Figure 7:
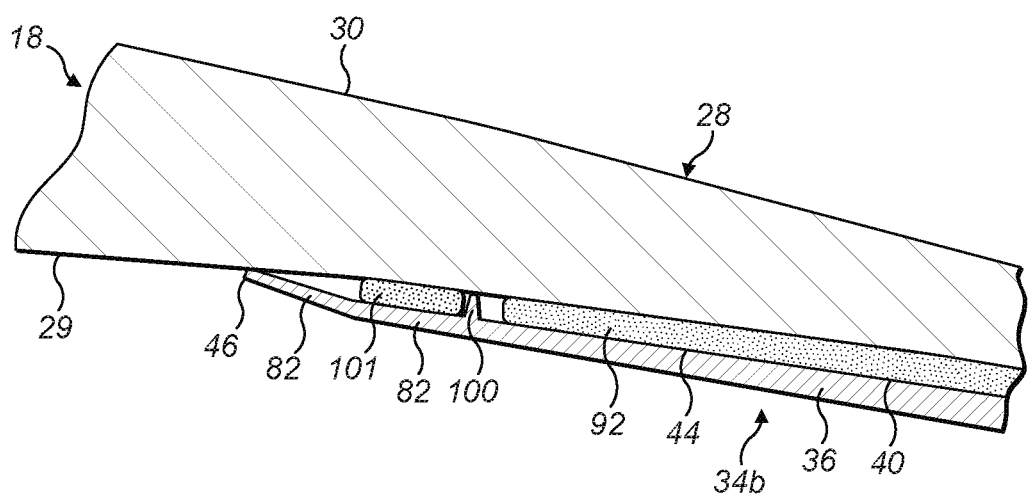
FIG. 7 illustrates a third embodiment of the serrated trailing edge device.

FIG. 7 shows an aerodynamic device 34b in accordance with a third embodiment of the present invention. The aerodynamic device 34b is identical to the devices 34, 34a described above according to the first and second embodiments, except that it includes a single ridge 100 protruding from the inner surface 40 of the baseplate 36 instead of the series of ridges 60 of the first embodiment or the flexible lip 98 of the second embodiment. The single ridge 100 is provided along a substantially trapezoidal path and forms a continuous loop surrounding the mounting region 44. In this respect, the ridge 100 is similar to one of the ridges 60 of the first embodiment. The ridge 100 is therefore provided between the periphery 46 of the baseplate 36 and the mounting region 44.

As with the first embodiment, the height of the ridge 100 is slightly less than the thickness of the adhesive tape 92 such that the ridge 100 does not make contact with the pressure surface 29 of the blade 18 when the device 34b is mounted to the blade 18. The ridge 100 therefore does not affect compression of the adhesive tape 92 and hence does not affect the bond between the device 34b and the blade 18. A rubber gasket 101 is provided between the perimeter 46 of the baseplate 36 and the mounting region 44 instead of the wet sealant 97 described in relation to the first and second embodiments. The ridge 100 provides a barrier between the rubber gasket 101 and the adhesive tape 92 and serves to retain the gasket 101 in place and prevent the gasket 101 from coming into contact with the adhesive tape 92. The rubber gasket 101 therefore does not interfere with the bond between the device 34b and the blade 18. The gasket 101 protects the adhesive tape 92 from ingress of dust or moisture which may otherwise cause deterioration of the adhesive 92 over time when the blade 18 is in use.

The rubber gasket 101 is provided within the periphery 46 of the baseplate 36 and is covered by the skirt 82. The skirt 82 therefore protects the gasket 101 from direct exposure to climatic conditions and conceals the gasket 101 so that the gasket 101 does not detract from the aesthetic appearance of the blade 18. Further, the concealed gasket 101 does not adversely affect the aerodynamic performance of the blade 18 since it is not directly exposed to airflow over the blade 18. The skirt 82 is shaped to provide optimum airflow over the blade 18, which allows consistent and reproducible performance to be achieved.

Figure 8:
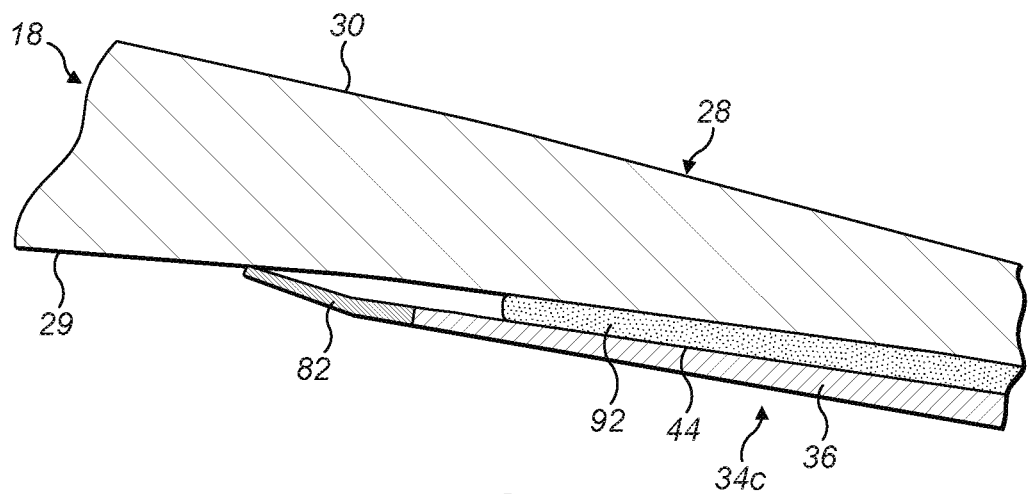
FIG. 8 illustrates a fourth embodiment of the serrated trailing edge device.

FIG. 8 shows an aerodynamic device 34c in accordance with a fourth embodiment of the present invention. The aerodynamic device 34c is similar to the previous embodiments except that it does not includes any barriers such as ridges or lips surrounding the mounting region 44 of the baseplate 36. Instead, in this embodiment, the skirt 82 is formed of rubber and provides the same function as the gasket 101 of the third embodiment. Accordingly, the rubber skirt 82 forms a seal against the pressure surface 29 of the blade 18 and prevents ingress of moisture, dust and other contaminants between the baseplate 36 and the blade surface 28.

Figure 9:
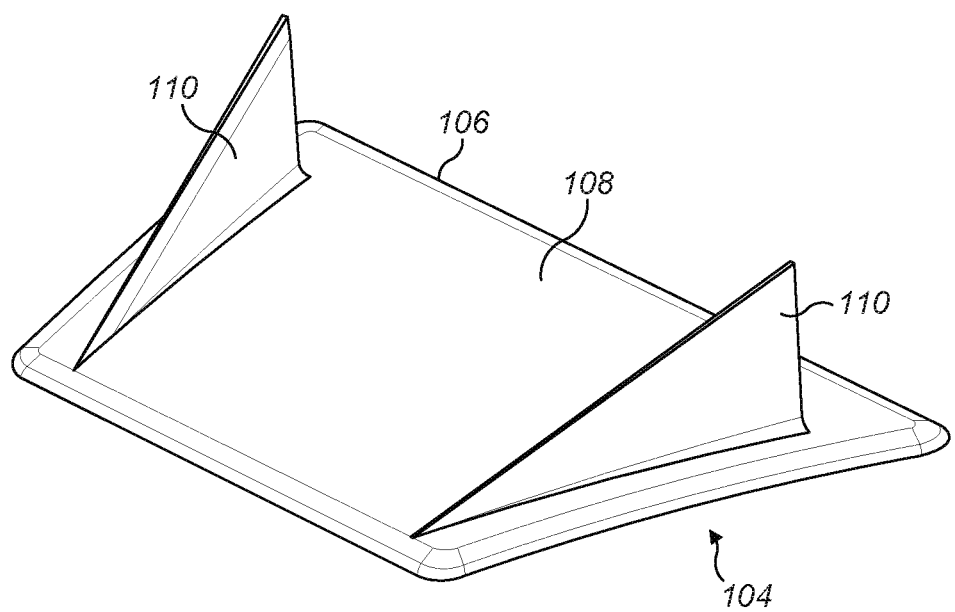
FIG. 9 illustrates a vortex generator device according to the present invention.

Whilst the present invention has been described by way of example above in relation to a serrated trailing edge device, it will be appreciated that the inventive principles described above can be applied equally to other aerodynamic devices such as vortex generators and flaps which include a baseplate for bonding to the surface 28 of the blade 18. A vortex generator device 104 is shown, for example, in FIG. 9. The vortex generator 104 includes a baseplate 106 having inner and outer surfaces of which an outer surface 108 is visible in FIG. 9. A pair of fins 110 project from the outer surface 108, whilst the inner surface is adapted for bonding to the surface 28 of a blade 18 in substantially the same way as the baseplate 36 of any of the devices described in the previous embodiments.

The anti-peel fingers 84 described in relation to FIGS. 3 and 3a are an optional feature that may be used in relation to any of the examples described above to further prevent detachment of the device in use.

Many modifications may be made to the above examples without departing from the invention as defined in the following claims. For example, whilst adhesive tape 92 has been described in relation to the above examples, other suitable adhesive may be used to bond the baseplate 36 to the outer surface 28 of the blade 18, for example structural adhesive such as epoxy or methacrylate adhesives may be used. The number and dimensions of the various ridges 60 and channels 72 in the first embodiment may vary in other embodiments. A variant of the second embodiment may include multiple lips. Further embodiments may, for example, incorporate a combination of lips and ridges. A flexible skirt, such as the skirt 82 described in relation to the fourth embodiment shown in FIG. 8, may be used with any of the embodiments to form a seal against the surface of the blade 18. The baseplate can also be bonded to the pressure surface 29 or the suction surface 30 of the blade.

The invention claimed is:

1. A wind turbine blade comprising an aerodynamic device mounted to an outer surface of the blade, the aerodynamic device comprising a baseplate having an inner surface defining a mounting region and a sealing region at least partially surrounding the mounting region, wherein:
    the mounting region is bonded to the outer surface of the blade by an adhesive;
    a seal is provided between the sealing region of the baseplate and the outer surface of the blade, the seal at least partially surrounding the mounting region; and
    a barrier is provided between the seal and the adhesive, the barrier being arranged substantially to prevent contact between the seal and the adhesive,
    wherein the sealing region comprises a skirt at least partially surrounding the mounting region, the skirt being arranged to cover the seal.

2. The wind turbine blade of claim 1, wherein the barrier is integral with the baseplate.

3. The wind turbine blade of claim 1, wherein the barrier forms a second seal around the adhesive.

4. The wind turbine blade of claim 1, wherein the barrier includes one or more features protruding from the inner surface of the baseplate.

5. The wind turbine blade of claim 1, wherein the barrier comprises a ridge.

6. The wind turbine blade of claim 1, wherein the barrier is configured to define a tortuous path between the seal and the adhesive.

7. The wind turbine blade of claim 1, wherein the seal comprises sealant or a gasket.

8. The wind turbine blade of claim 1, wherein the skirt is inclined relative to the mounting region and a peripheral edge of the skirt is substantially in contact with the outer surface of the blade.

9. The wind turbine blade of claim 8, wherein the peripheral edge of the skirt forms a seal against the outer surface of the blade.

10. The wind turbine blade of claim 1, wherein the aerodynamic device is mounted to a trailing edge of the blade.

11. The wind turbine blade of claim 10, wherein the aerodynamic device includes a plurality of serrations extending from the baseplate.

12. The wind turbine blade of claim 1, wherein the baseplate is bonded to a pressure surface of the blade and the aerodynamic device further comprises one or more anti-peel features extending from the baseplate and overlapping a suction surface of the blade.

13. The wind turbine blade of claim 12, wherein the anti-peel features comprise one or more fingers.

14. A wind turbine comprising the wind turbine blade of claim 1.

15. A wind turbine blade comprising an aerodynamic device mounted to an outer surface of the blade, the aerodynamic device comprising a baseplate having an inner surface defining a mounting region and a sealing region at least partially surrounding the mounting region, wherein:
the mounting region is bonded to the outer surface of the blade by an adhesive;
a seal is provided between the sealing region of the baseplate and the outer surface of the blade, the seal at least partially surrounding the mounting region; and
a barrier is provided between the seal and the adhesive, the barrier being arranged substantially to prevent contact between the seal and the adhesive,
wherein the barrier comprises a plurality of ridges that are spaced apart such that channels are defined between adjacent ridges.

16. The wind turbine blade of claim 15, wherein the seal comprises sealant and at least some of the sealant is located in at least one of the channels.

17. The wind turbine blade of claim 15, wherein a gap is defined between a tip of each of the plurality of ridges and the outer surface of the blade.

18. A wind turbine blade comprising an aerodynamic device mounted to an outer surface of the blade, the aerodynamic device comprising a baseplate having an inner surface defining a mounting region and a sealing region at least partially surrounding the mounting region, wherein:
the mounting region is bonded to the outer surface of the blade by an adhesive;
a seal is provided between the sealing region of the baseplate and the outer surface of the blade, the seal at least partially surrounding the mounting region; and
a barrier is provided between the seal and the adhesive, the barrier being arranged substantially to prevent contact between the seal and the adhesive,
wherein the barrier comprises a lip that forms a further seal against the outer surface of the blade.

19. The wind turbine blade of claim 18, wherein the lip is flexible and is angled towards an outer perimeter of the baseplate.

\* \* \* \* \*